UNITED STATES PATENT OFFICE.

ALFRED A. WOHLAUER, OF NEW YORK, N. Y.

CHART FOR DETERMINING THE FLUX OF LIGHT.

1,034,943.  Specification of Letters Patent.  Patented Aug. 6, 1912.

Application filed December 18, 1908. Serial No. 468,157.

*To all whom it may concern:*

Be it known that I, ALFRED A. WOHLAUER, a subject of the Emperor of Germany, and resident of the borough of Manhattan, city, county, and State of New York, have invented certain new and useful Improvements in Charts for Determining the Flux of Light, of which the following is a specification.

My invention relates to charts or ruled sheets for the use of illuminating engineers in solving problems by the aid of the so-called flux of light method. For the sake of explanation, I will say that the flux of light is defined as the total amount of radiation issuing from a single source of light or from a number of light sources. This "flux of light" is generally measured in lumens, a lumen being $\frac{1}{4\pi}$ of the flux of one mean spherical candle and thus equaling the flux required to give one square foot an illumination of one foot candle.

Problems in illuminating involve the reflection or distribution of the available flux of light to secure certain results, such as a uniform average illumination (flux density) of a given surface or area. My improved chart enables such problems to be solved much more readily than any other means or method known to me, and without any complicated calculations.

Figure 1:
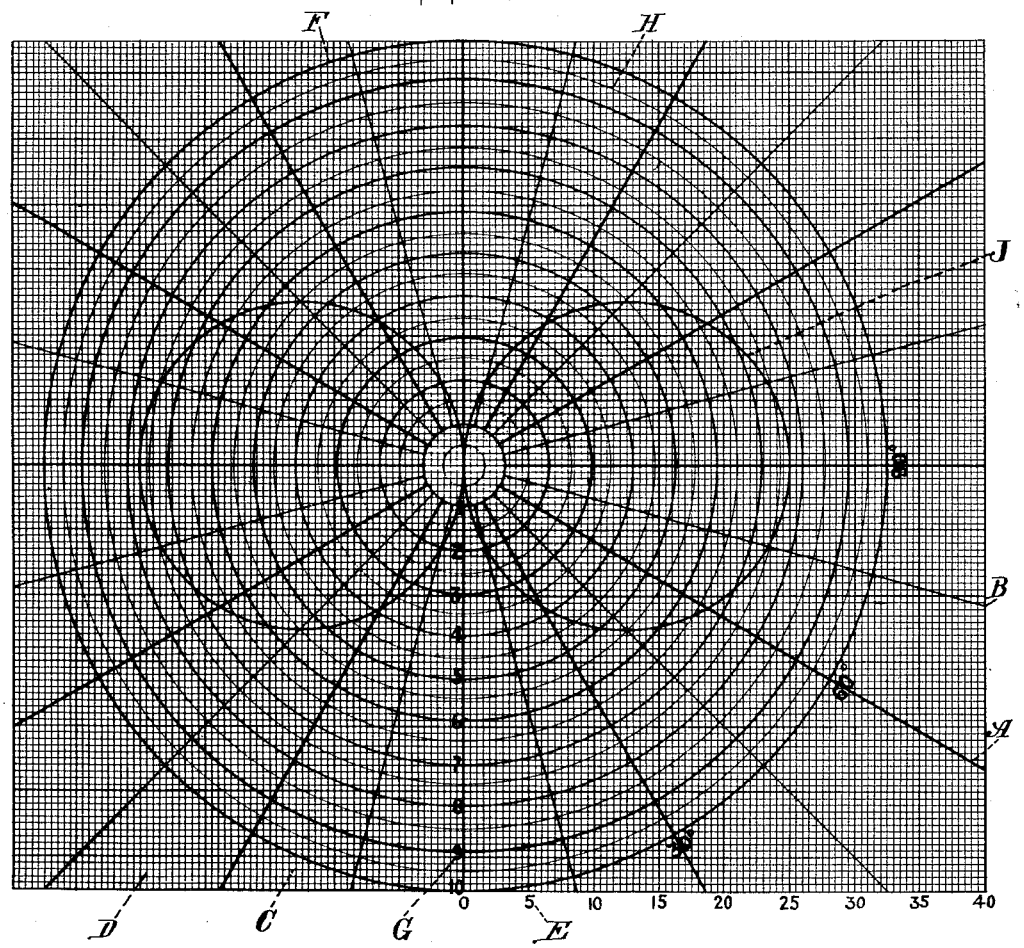
Figure 2:
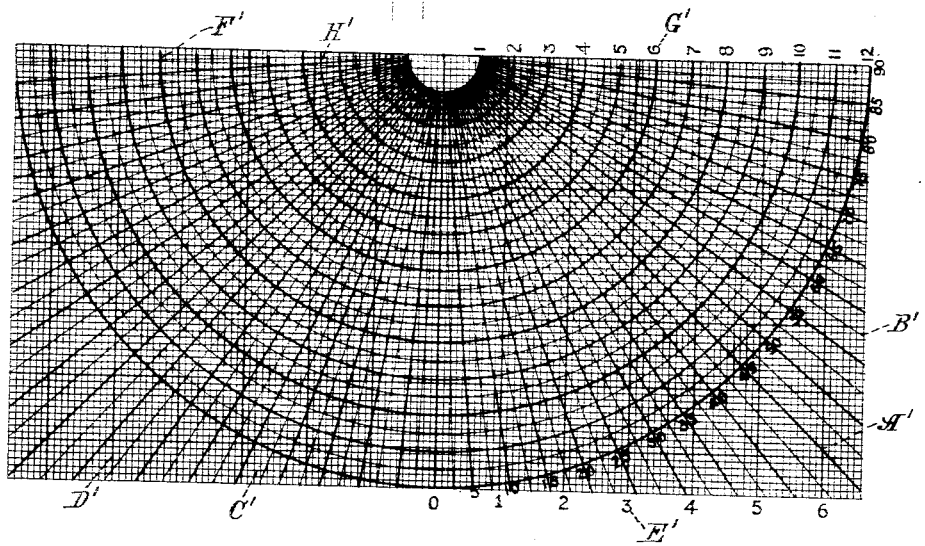
Figure 3:
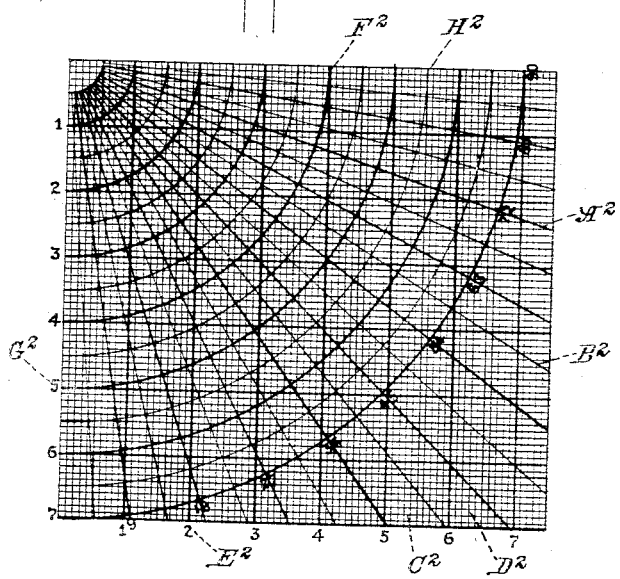

Figures 1, 2 and 3 of the accompanying drawings illustrate three different charts embodying my invention.

In each case I employ a combination of rectangular and polar coördinates, and in the drawings the chart consists of a series of concentric circles, a number of lines radiating from the center of said circles, and a network of lines crossing each other at right angles and forming squares similar to those of the well-known cross-section paper. In charts embodying my invention, a peculiar definite relation, fully set forth hereinafter, obtains between the angular subdivisions (or in other words, the number of radial lines) and the ratio between the unit of the rectangular coördinates and that of the scale which the circles indicate on the radial lines. The charts may be printed or otherwise produced on any suitable material, generally paper.

Fig. 1 shows what may be termed a 30° chart, since the subdivisions indicated by the heavy radial lines A are sectors of 30° each. The thin radial lines B are the median lines or bisectrices of these divisions or sectors. The horizontal lines C (abscissæ) which measure the flux in lumens, and the vertical lines D, which indicate the lumens according to the notation or scale E, are evenly spaced, the interval in this particular case corresponding to a half unit. The zero of the scale E corresponds to the center from which the lines A, B radiate. Around this center are described parallel circles F, evenly spaced, the interval between adjacent circles indicating one candle, as shown by the polar candle scale G. The unit interval of the scale G is shown as bearing the ratio 3.25 to the unit interval of the scale E, which is in practice a sufficiently close approximation to the theoretical ratio. Intermediate thinner circles H may be described half-way between the circles F, and of course the degree of subdivision may be varied, both for the rectangular coördinates and for the circles. (It will be seen that the ten units of the scale G occupy a space corresponding to 32.5 units of the scale E.)

The chart Fig. 2 shows semicircles F′, H′ instead of the full circles F, H of Fig. 1, and the subdivisions for the radial lines A′ are shown as 5°. With this angle the ratio of the unit of the candle scale G′ to that of the lumen scale E′ is .55. The general arrangement of lines and scales is similar to that of Fig. 1, as may be seen by the reference letters applied to corresponding parts.

Fig. 3 shows still another angular subdivision viz. one of 9°, and also shows the chart extended only through 90°. The 9° division has the peculiarity of giving almost equal value to the units of the lumen scale and of the candle scale; in the drawing they have been shown equal, which in practice is a negligible departure from the theoretically correct ratio of .99.

These examples are intended to show that my invention is not limited to any particular angular subdivision, or to any particular extent of the chart. Of the chart shown in Fig. 1, only a portion, say one-half or one-fourth, may be sufficient in some cases, and similarly, the charts Figs. 2 and 3 may be extended to the full circle if desired. I wish it to be understood that the term "circle" as used in the claims, includes semicircles or other circular arcs as well as full circles. In all forms of my invention, however, the unit of the lumen scale bears a definite relation to that of the candle scale, said relation or ratio being a function of the angular subdivision employed. If this angle be $\alpha$, then the said ratio is $$R = \frac{2\pi(1-\cos.\alpha)}{\sin.\frac{\alpha}{2}} = \frac{2\pi \cdot 2\sin.^2\frac{\alpha}{2}}{\sin.\frac{\alpha}{2}} = 4\pi\sin.\frac{\alpha}{2}.$$

In Figs. 1, 2 and 3, $\alpha$ equals 30°, 5° and 9° respectively, and the ratio R is 3.3, .55, and .99 respectively. This ratio is arrived at as follows: It has been demonstrated that the flux W over a certain angle represented by the difference between two angles $\alpha_2 - \alpha_1$, both measured from the same axis, is a function of the mean zonolar candle power P and of the angles, to wit:

$$W = 2\pi P(\cos.\alpha_1 - \cos.\alpha_2).$$

The length of any abscissa is found as $$P\sin.\frac{\alpha}{2}$$

(see the triangle inclosed by the first two lines A, B of Fig. 1), if $\alpha$ indicates the angle of subdivision (30° in Fig. 1). Now it is well known that $$\cos.\alpha_1 - \cos.\alpha_2 = 2\sin.\frac{\alpha_1+\alpha_2}{2}\sin.\frac{\alpha_2-\alpha_1}{2}.$$

Therefore $$W = 2\pi P 2\sin.\frac{\alpha_1+\alpha_2}{2}\sin.\frac{\alpha_2-\alpha_1}{2}.$$

For equal angles of subdivision, $\alpha_2 - \alpha_1$ is constant, and therefore $$\sin.\frac{\alpha_2-\alpha_1}{2}$$

is also constant. Therefore the relation of the fluxes for equal angular subdivisions will be directly proportional to $$\sin.\frac{\alpha_1+\alpha_2}{2}$$

and to the candle power P. For $\alpha_1 = 0°$, we have $$\sin.\frac{\alpha_1+\alpha_2}{2} = \sin.\frac{\alpha}{2},$$

showing that the flux is proportional to the abscissæ. For $\alpha_1 = 0°$, we have $$W = 2\pi P(1-\cos.\alpha).$$

Therefore the ratio R of flux to abscissa, for equal subdivisions, is $$R = \frac{2\pi P(1-\cos.\alpha)}{P\sin.\frac{\alpha}{2}} = \frac{2\pi(1-\cos.\alpha)}{\sin.\frac{\alpha}{2}} = 4\pi\sin.\frac{\alpha}{2}.$$

The median lines B, B', B² indicate the flux of light issuing over the angle between the corresponding adjacent lines A, A' or A² respectively.

A brief example may illustrate the use of my invention. Suppose that, as shown at J in Fig. 1, the polar curve or diagram has been plotted on the chart in the well-known manner. If it is desired to find the flux distribution over the angle from 0° to 60°, we proceed as follows: We find the abscissa corresponding to the point of intersection of the polar curve J with the first line B (at 15°), which abscissa (found as 1.5) determines the flux over the angle from 0° to 30°. Similarly the abscissa of the point of intersection of the polar curve J with the second line B (at 45°) measures the flux over the angle from 30° to 60° (this abscissa is found as, say 12.5). The total flux from 0° to 60° equals the sum of the two fluxes determined as above, that is to say $$1.5 + 12.5 = 14 \text{ lumens.}$$

The horizontal lines C, C', C², which serve simply as guide lines for the eye, may be omitted. Similarly, I may dispense with the radial lines A, A', A², retaining the radial lines B, B', B². I might also produce the rectangular network of lines (or the vertical lines alone) on one sheet, and the circles and radii on another sheet, one of them at least being transparent so that when they are superposed, they will constitute together a chart such as herein described. Such a chart, whether made of one piece or more, I consider as falling within the scope of my invention as defined in the claims.

I have explained above that in my improved chart the ratio of the unit of the candle scale G, G', G² to the unit of the lumen scale E, E' E² is equal to $$\frac{2\pi(1-\cos.\alpha)}{\sin.\frac{\alpha}{2}}$$

or—

$$4\pi\sin.\frac{\alpha}{2}.$$

For very small angles the sine may be considered as approximately equal to the arc and within limits, say up to 10°, the simpler ratio of $22\pi\alpha$ may be substituted as an equivalent for the more accurate ratio above given and I desire it to be understood that this equivalent also is to be covered by the appended claims.

I claim as my invention:

1. A chart comprising a network produced by two intersecting series of parallel lines, a series of concentric circles, and a series of radial lines, the lines being evenly spaced in each individual series, and the ratio of the unit interval between said circles to the unit interval between the parallel lines, being equal to $$4\pi \sin \frac{\alpha}{2},$$

where $\alpha$ indicates the unit of angular subdivision produced by the radial lines.

2. A chart comprising series of straight parallel lines, a series of concentric circles, and a series of radial lines, the ratio of the unit interval between said circles to the unit interval between the parallel lines being equal to $$4\pi \sin \frac{\alpha}{2},$$

where $\alpha$ indicates the unit of angular subdivision produced by the radial lines.

3. A chart comprising a series of evenly spaced straight parallel lines, a series of evenly spaced concentric circles, and a series of evenly spaced radial lines, the ratio of the unit interval between the circles to the unit interval between the said parallel lines being equal to $$4\pi \sin \frac{\alpha}{2}$$

where $\alpha$ indicates the unit of angular subdivision produced by the radial lines.

4. As a new article of manufacture, a chart composed of a sheet of material having produced thereon a series of straight parallel lines indicating lumens, a series of concentric circles indicating candle power, a series of radial lines forming equal angular subdivisions and a series of radial lines which bisect the angles between each two adjoining radial lines of the first-named series of radial lines, the ratio of the unit interval between the circles to the unit interval between the said parallel lines, being equal to $$4\pi \sin \frac{\alpha}{2},$$

where $\alpha$ indicates the unit of angular subdivisions.

In witness whereof I have hereunto set my hand in the presence of two subscribing witnesses.

ALFRED A. WOHLAUER.

Witnesses:
JOHN LOTKA,
JOHN A. KEHLENBECK.